US012092298B2

(12) United States Patent
Luo et al.

(10) Patent No.: US 12,092,298 B2
(45) Date of Patent: Sep. 17, 2024

(54) LAMP

(71) Applicant: Sinowell (Shanghai) Co., Ltd., Shanghai (CN)

(72) Inventors: Jia Luo, Shanghai (CN); Yunfei Duan, Shanghai (CN); Liang Zhou, Shanghai (CN)

(73) Assignee: SINOWELL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/913,715

(22) PCT Filed: Jun. 28, 2022

(86) PCT No.: PCT/CN2022/101801
§ 371 (c)(1),
(2) Date: Sep. 22, 2022

(87) PCT Pub. No.: WO2023/159831
PCT Pub. Date: Aug. 31, 2023

(65) Prior Publication Data

US 2024/0003521 A1 Jan. 4, 2024

(30) Foreign Application Priority Data

Feb. 22, 2022 (CN) ......................... 202210160657.9
Feb. 22, 2022 (CN) ......................... 202220355020.0

(51) Int. Cl.
*F21V 21/005* (2006.01)
*F21S 2/00* (2016.01)
(Continued)

(52) U.S. Cl.
CPC ............ *F21V 21/005* (2013.01); *F21S 2/005* (2013.01); *F21V 21/002* (2013.01); *F21V 23/06* (2013.01)

(58) Field of Classification Search
CPC .......................... F21S 2/00–005; F21V 23/06; F21V 19/0045; F21V 21/005; H01R 13/639
See application file for complete search history.

(56) References Cited

U.S. PATENT DOCUMENTS

2005/0007780 A1* 1/2005 Feuerborn ............... F21V 23/06 362/257
2015/0167948 A1* 6/2015 Wasserman ............... F21S 8/03 362/249.01
(Continued)

FOREIGN PATENT DOCUMENTS

CN 103867990 6/2014
CN 203940308 11/2014
(Continued)

OTHER PUBLICATIONS

International Search Report dated Sep. 28, 2022 from corresponding PCT Application No. PCT/CN2022/101801.

*Primary Examiner* — Mariceli Santiago
(74) *Attorney, Agent, or Firm* — ArentFox Schiff LLP

(57) ABSTRACT

Provided is a lamp. The lamp includes a plurality of lamp bodies. A connector is disposed between two adjacent lamp bodies. One end of the connector is connected to the lamp body corresponding to the one end by at least one locking connection structure. The lamp body is configured to be moved towards or away from the connector connected to the lamp body. The locking connection structure is configured to lock the one end of the connector to the lamp body corresponding to the one end or unlock the one end of the connector from the lamp body corresponding to the one end.

8 Claims, 7 Drawing Sheets

(51) Int. Cl.
*F21V 21/002* (2006.01)
*F21V 23/06* (2006.01)

(56) References Cited

U.S. PATENT DOCUMENTS

| | | | | |
|---|---|---|---|---|
| 2020/0271289 | A1* | 8/2020 | Lang | F21V 21/005 |
| 2022/0057054 | A1* | 2/2022 | Zheng | A01G 7/045 |

FOREIGN PATENT DOCUMENTS

| | | | | |
|---|---|---|---|---|
| CN | 210462742 | | 5/2020 | |
| CN | 212961104 | | 4/2021 | |
| CN | 113382514 | A * | 9/2021 | |
| CN | 215001426 | | 12/2021 | |
| CN | 114413233 | | 4/2022 | |
| EP | 1980785 | A1 * | 10/2008 | F21S 2/005 |
| JP | 2018014193 | | 1/2018 | |

* cited by examiner

LAMP

CROSS-REFERENCE TO RELATED APPLICATION(S)

This is a national stage application filed under 25 U.S.C. 371 based on International Patent Application No. PCT/CN2022/101801, filed Jun. 28, 2022, which claims priority to Chinese Patent Application No. 202210160657.9 filed with the China National Intellectual Property Administration (CNIPA) on Feb. 22, 2022 and claims priority to Chinese Patent Application No. 202220355020.0 filed with the CNIPA on Feb. 22, 2022, the disclosures of which are incorporated herein by reference in their entireties.

TECHNICAL FIELD

The present application relates to the technical field of lighting, for example, a lamp.

BACKGROUND

A lamp body is usually provided with one or more illuminants for lighting. However, when used in special scenarios such as tents, farms, and planting fields, multiple lamp bodies are often required. Two adjacent lamp bodies need to be connected together.

In the related art, two adjacent lamp bodies are connected in the following manners.

(1) Secured connection, that is, two adjacent lamp bodies are secured by engagement or the like. The spacing between the lamp bodies is fixed and cannot be adjusted. (2) Movable connection, that is, the spacing between two adjacent lamp bodies can be adjusted by a transmission mechanism such as a lead screw. However, in this connection manner, the structure is complex, the cost is high, and the overall volume of the lamp bodies is so large that the lamp bodies are not easy to disassemble, assemble and carry.

SUMMARY

The present application provides a lamp body so that the spacing between lamps can be adjusted. The lamp body is convenient to disassemble and assemble, and the volume of the lamp body is small.

A lamp includes a plurality of lamp bodies. A connector is disposed between two adjacent lamp bodies. One end of the connector is connected to the lamp body corresponding to the one end by at least one locking connection structure. The lamp body is configured to be moved towards or away from the connector connected to the lamp body. The locking connection structure is configured to lock the one end of the connector to the lamp body corresponding to the one end or unlock the one end of the connector from the lamp body corresponding to the one end.

REFERENCE LIST

Figure 1:
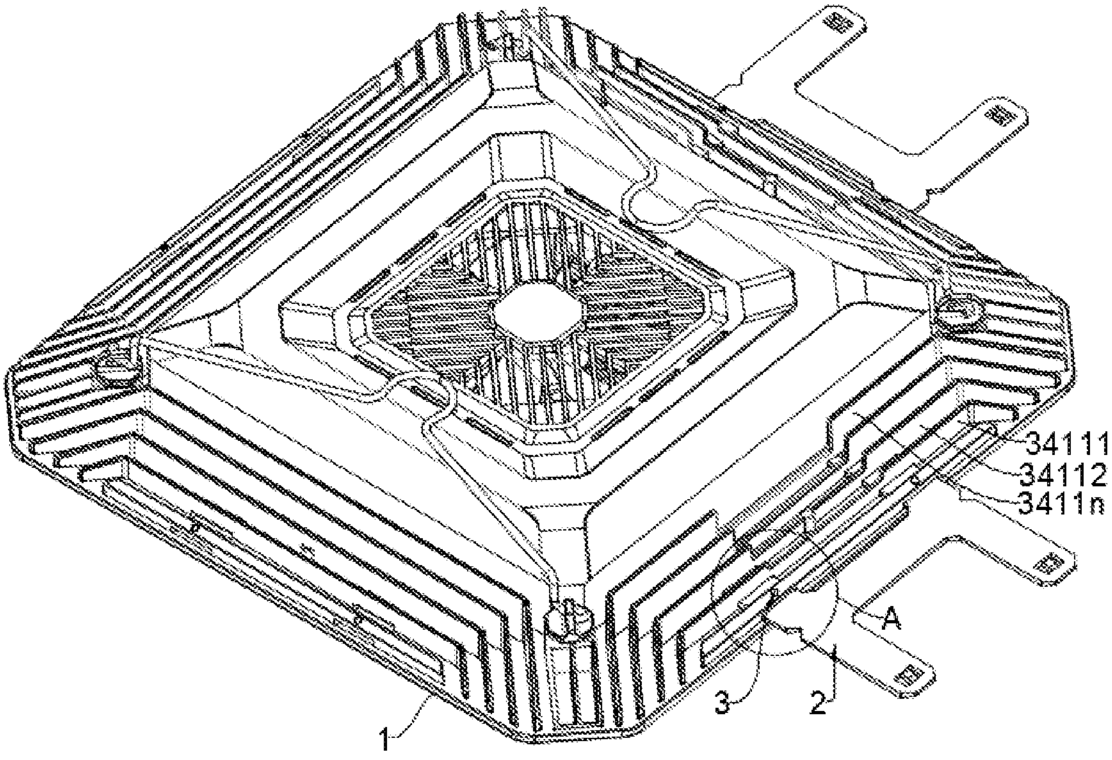
FIG. 1 is a view illustrating a connection relationship between a lamp body and a connector according to an embodiment of the present application.

1 lamp body
1*a* first row of lamp bodies
1*b* second row of lamp bodies
1*c* third row of lamp bodies
2 connector
2*a* first connector
20*a* first connection portion
2*b* second connector
20*b* second connection portion
21 connection part
22 extension part
3 locking connection structure
31 connection hole
32 long connection hole
33 locking member
34 receiving portion
341 riser
3411 insertion hole
34111 first heat dissipation fin
34112 second heat dissipation fin
3411*n* nth heat dissipation fin
342 stop block
35 insertion portion
351 elastic piece

DETAILED DESCRIPTION

Technical solutions in the embodiments of the present application will be described in conjunction with drawings in the embodiments of the present application. The embodiments described herein are part of the embodiments of the present application. Generally, the components of this embodiment of the present application described and illustrated in the drawings herein may be arranged and designed through various configurations.

Therefore, the following description of the embodiments of the present application provided in the drawings merely represents selected embodiments of the present application.

Similar reference numerals and letters indicate similar items in the following drawings, and therefore, once an item is defined in one drawing, the item needs no definition and explanation in subsequent drawings.

In the description of the present application, the orientational or positional relationships indicated by terms “above”, “below”, “left”, “right”, “vertical”, “horizontal”, “inside”, “outside” and the like are based on the orientational or positional relationships illustrated in the drawings or the orientational or positional relationship that products of the present application are usually used in. These orientations or position relations are intended only to facilitate and simplify description of the present application, and not to indicate or imply that a device or element referred to must have such specific orientations or must be configured or operated in such specific orientations. Thus, these orientations or position relations are not to be construed as limiting the present application. Moreover, terms “first”, “second” and “third” are merely for distinguishing the description and are not to be construed as indicating or implying relative importance.

In the description of the present application, unless otherwise noted, the term "a plurality of" or "multiple" means two or more.

In the description of the present application, it is to be noted that unless otherwise expressly specified and limited, the term "configured" or "connected" is to be construed in a broad sense, for example, as securely connected, detachably connected or internally connected; or mechanically connected or electrically connected. For those of ordinary skill in the art, meanings of the preceding terms can be understood according to situations in the present application.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Embodiments of the present application are described in detail below, and examples of the embodiments are illustrated in the drawings, where the same or similar reference numerals indicate the same or similar elements or elements having the same or similar functions. The embodiments described below with reference to the drawings are illustrative and only for explaining the present application.

Figure 2:
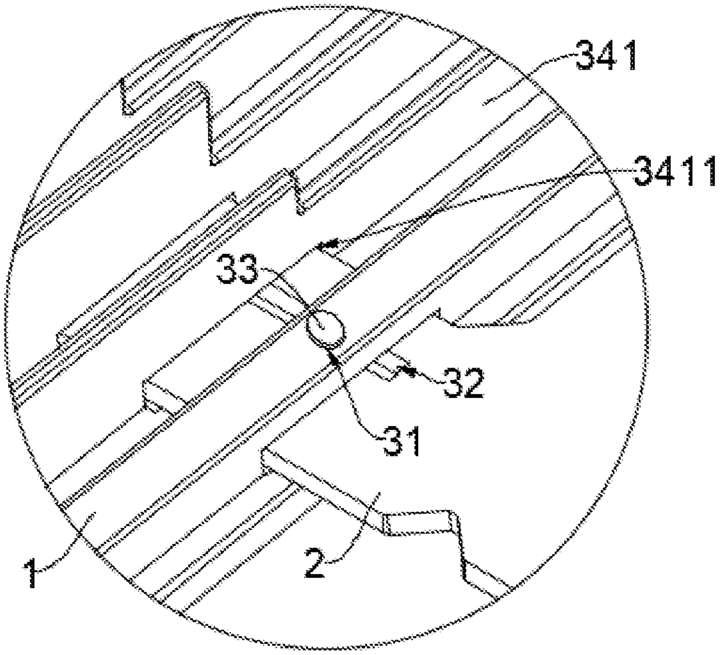
FIG. 2 is an enlarged view of part A of FIG. 1.
Figure 3:
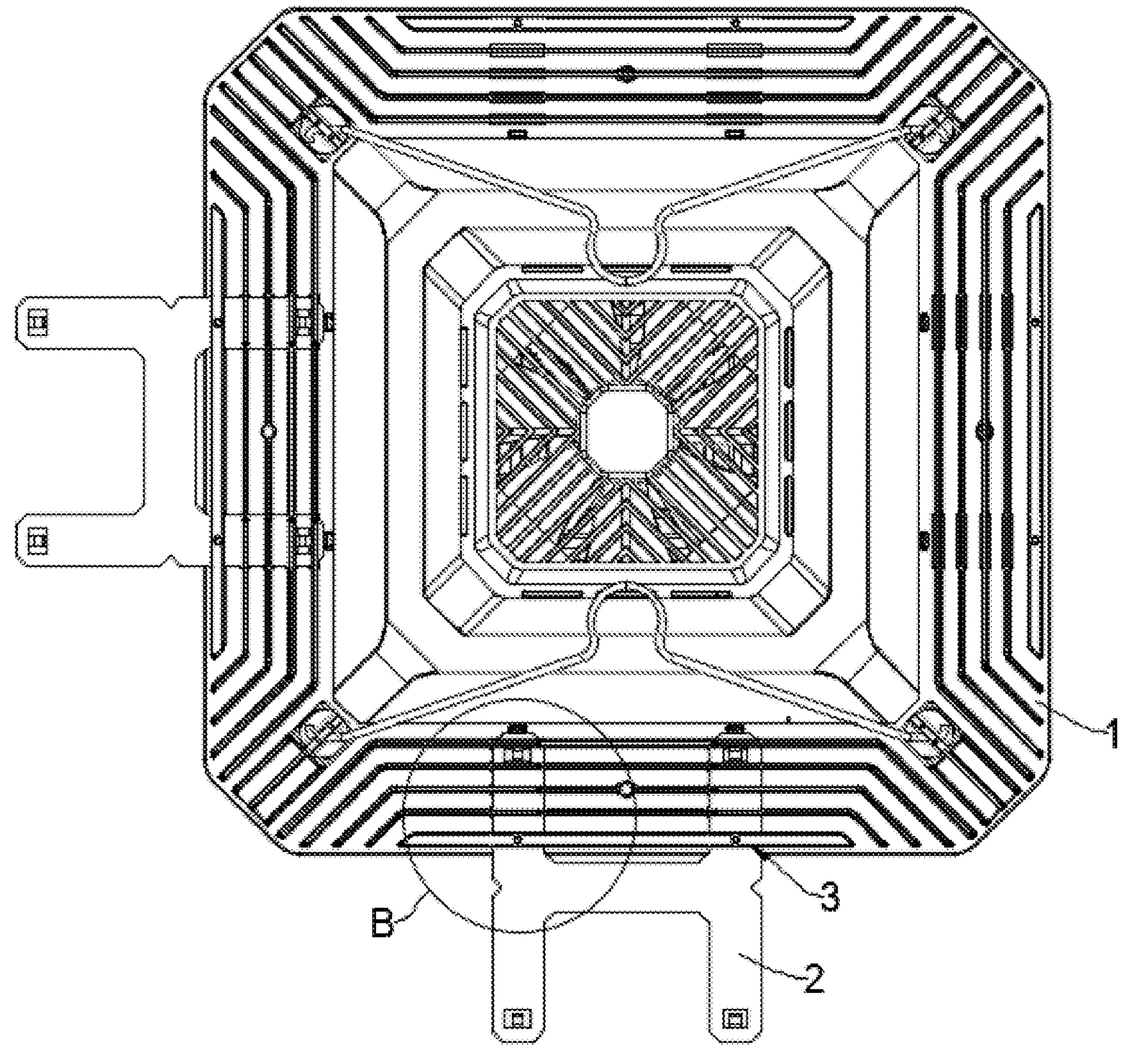
FIG. 3 is another view illustrating a connection relationship between a lamp body and a connector according to an embodiment of the present application.
Figure 4:
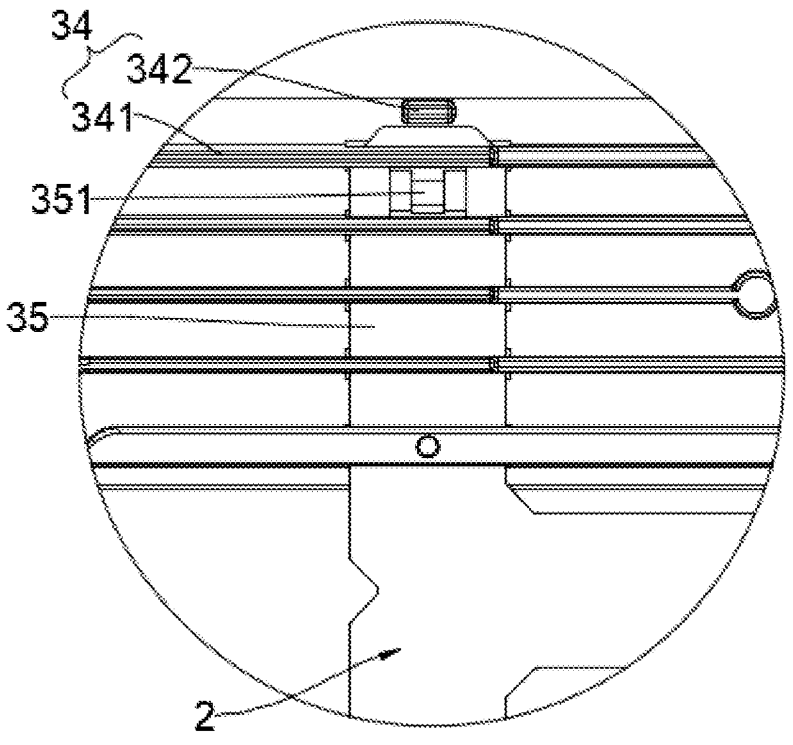
FIG. 4 is an enlarged view of part B of FIG. 3.
Figure 5:
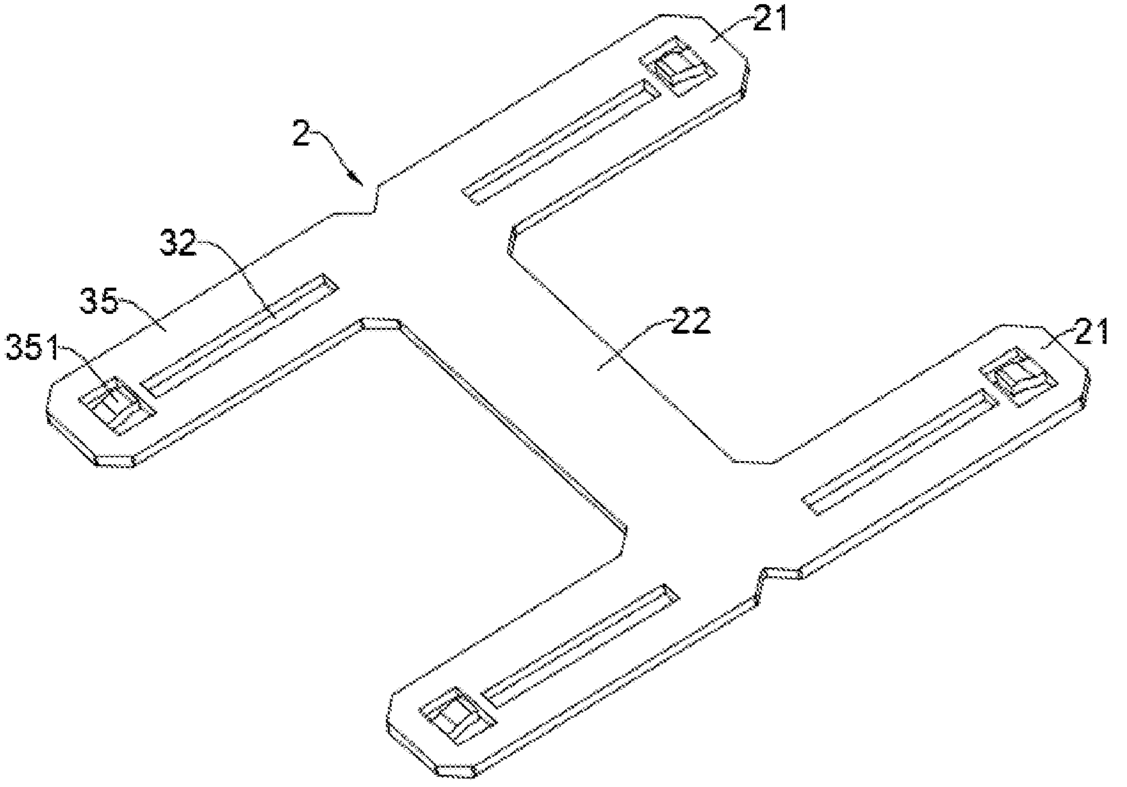
FIG. 5 is a view illustrating the structure of a connector according to an embodiment of the present application.
Figure 6:
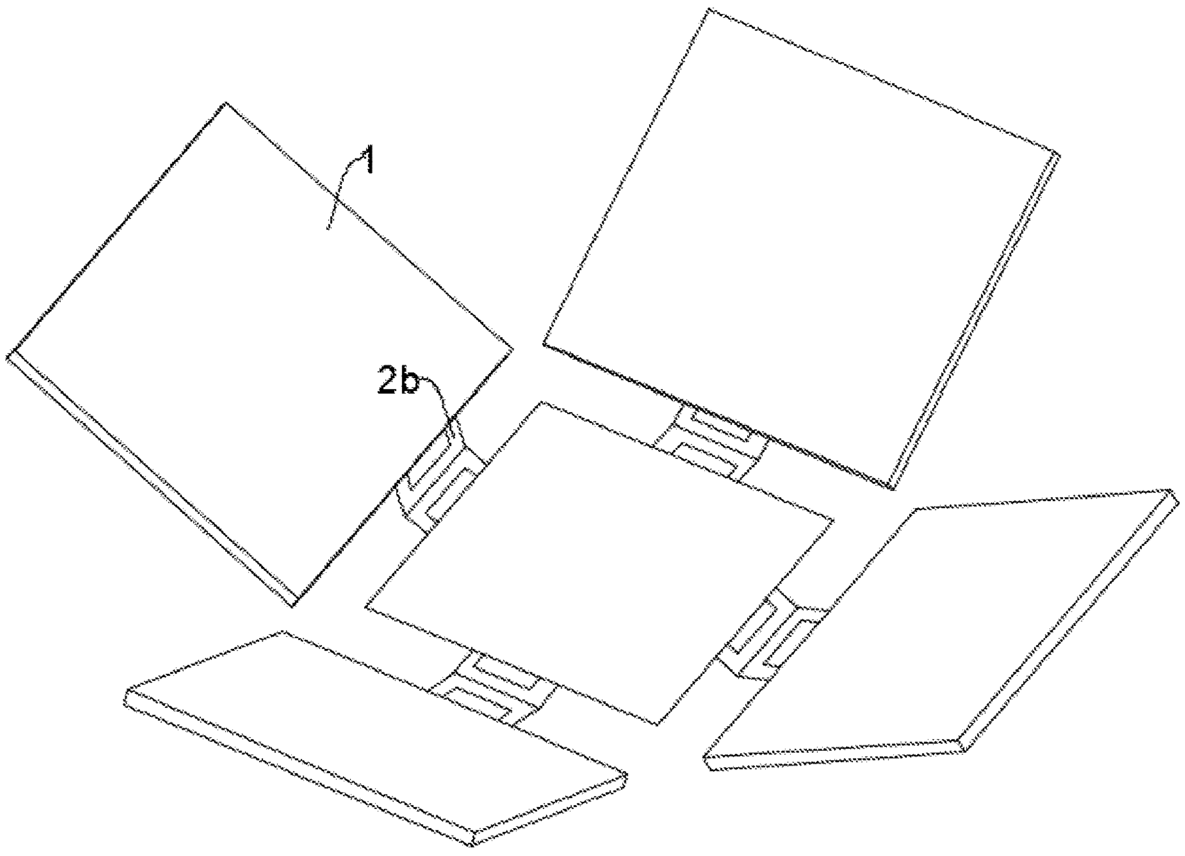
FIG. 6 is a view illustrating the structure of a lamp according to an embodiment of the present application.
Figure 7:
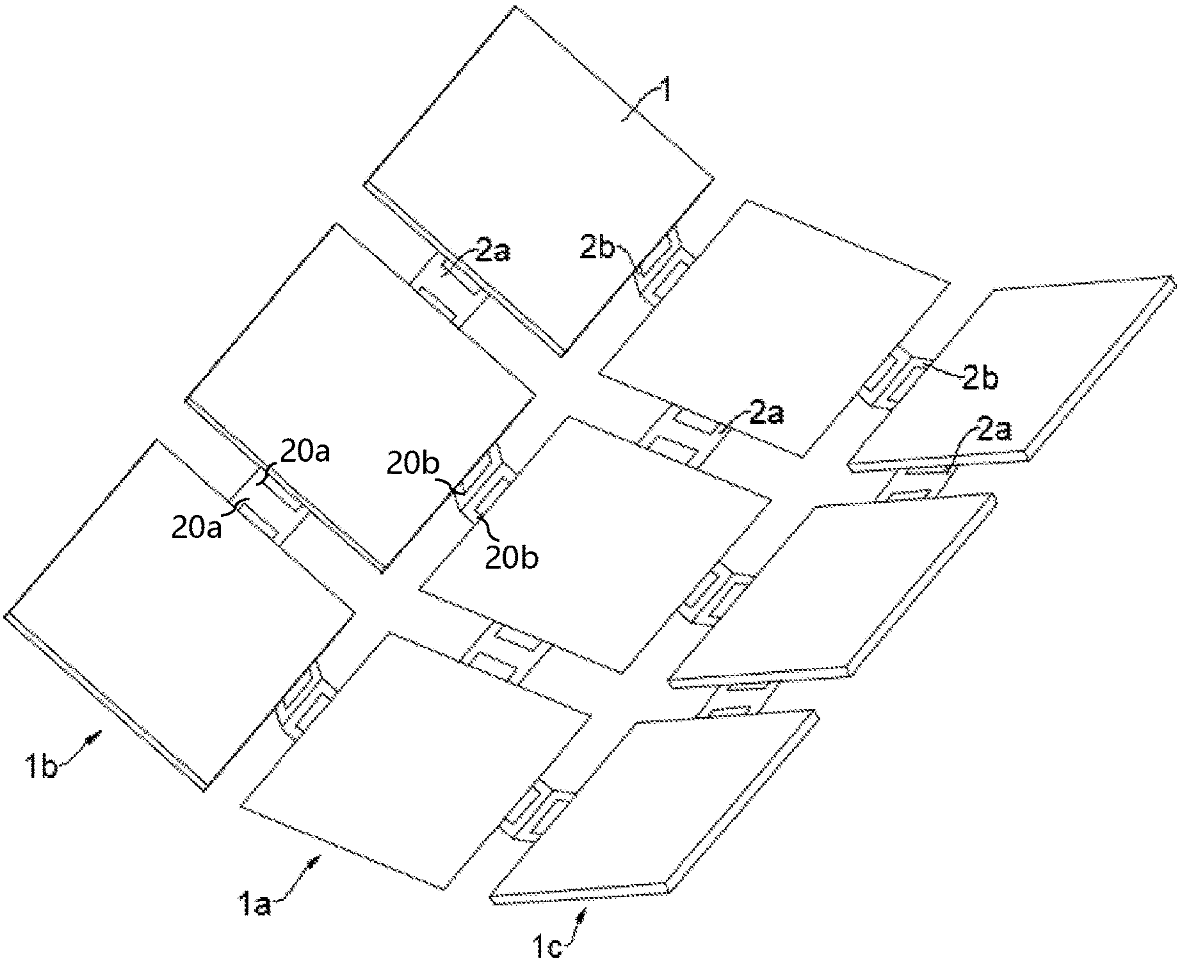
FIG. 7 is another view illustrating the structure of a lamp according to an embodiment of the present application.

As shown in FIGS. 1 to 7, this embodiment provides a lamp. The lamp includes multiple lamp bodies 1. A connector 2 is disposed between two adjacent lamp bodies 1. One end of the connector 2 is connected to the lamp body 1 corresponding to the one end by at least one locking connection structure 3. The lamp body 1 can be moved towards or away from the connector 2 connected to the lamp body 1. The locking connection structure 3 can lock the one end of the connector 2 to the lamp body 1 corresponding to the one end or unlock the one end of the connector 2 from the lamp body 1 corresponding to the one end.

The multiple lamp bodies 1 are disposed independently. The lamp bodies 1 can be moved towards or away from the connector 2 connected to the lamp bodies 1 to adjust the spacing between the two lamp bodies 1 located at two ends of the connector 2. The connector 2 and the lamp bodies 1 corresponding to the connector 2 can be locked by the locking connection structure 3. Therefore, not only can the requirements of various different sizes of tents, farms, and other use scenarios be met, but also the light can be more uniformly distributed. Compared with the related art, the lamp has the advantages of being simple in structure, small in volume, and convenient to transport and assemble.

Optionally, the locking connection structure 3 includes a connection hole 31, a long connection hole 32, and a locking member 33. The connection hole 31 is disposed in one of the connector 2 or the lamp body 1 corresponding to the connector 2. The long connection hole 32 is disposed in another one of the connector 2 or the lamp body 1 corresponding to the connector 2. The locking member 33 is inserted in the connection hole 31 and the long connection hole 32. The locking member 33 can be moved in the long connection hole 32 and can lock the connector 2 to the lamp body 1 corresponding to the connector 2 or unlock the connector 2 from the lamp body 1 corresponding to the connector 2. In this embodiment, the connection hole 31 is disposed in the lamp body 1, the long connection hole 32 is disposed in the connector 2, and the locking member 33 is a bolt and a nut. When the lamp body 1 is moved towards or away from the connector 2 connected to the lamp body 1 (at this time, the bolt is in a loose state), the bolt can be moved along the long connection hole 32, and the nut is slidably disposed in the long connection hole 32 and threadedly connected to the bolt. That is, the nut can only translate along the long connection hole 32 together with the bolt and cannot rotate. When the lamp body 1 is moved to a proper position, the connector 2 can be locked with the lamp body 1 corresponding to the connector 2 by tightening the bolt. In this embodiment, the locking connection structure 3 is simple in structure, convenient to operate, and small in volume so that the volume of the lamp cannot be increased.

In other embodiments, the locking connection structure 3 may be in other forms, as long as the lamp body 1 can be moved towards or away from the connector 2 connected to the lamp body 1, and the locking connection structure 3 can lock one end of the connector 2 to the lamp body 1 corresponding to the one end or unlock one end of the connector 2 from the lamp body 1 corresponding to the one end.

To increase the connection stability between the connector 2 and the lamp body 1 corresponding to the connector 2, the locking connection structure 3 further includes a receiving portion 34 and an insertion portion 35. The receiving portion 34 is disposed in one of the connector 2 or the lamp body 1 corresponding to the connector 2. The insertion portion 35 is disposed in another one of the connector 2 or the lamp body 1 corresponding to the connector 2. The insertion portion 35 can be inserted into or separated from the receiving portion 34. An insertion connection is used to facilitate assembly.

The receiving portion 34 includes multiple risers 341 disposed at intervals. Each of the multiple risers 341 is provided with an insertion hole 3411. The insertion portion 35 can be inserted into the insertion hole 3411 of at least one riser 341. The insertion portion 35 is provided with an elastic piece 351. The elastic piece 351 is configured to generate elastic deformation and prevent the insertion portion 35 from being pulled out from the insertion hole 3411. In this manner, the riser 341 can be clamped by the elastic piece 351 to reinforce the connection between the connector 2 and the lamp body 1. In the process in which the insertion portion 35 is inserted into the insertion hole 3411 of a riser 341 from one side of the riser 341, the elastic piece 351 is pressed by the inner wall of the insertion hole 3411 to generate elastic deformation so that the insertion portion 35 is smoothly inserted into the insertion hole 3411. After the insertion portion 35 is inserted into the insertion hole 3411, the elastic piece 351 can automatically reset and bounce up and abut another side of the riser 341 to prevent the insertion portion 35 from being pulled out from the insertion hole 3411.

In this embodiment, the insertion portion 35 is disposed on the connector 2, the receiving portion 34 is disposed on the lamp body 1 connected to the connector 2, and the multiple risers 341 are heat dissipation fins of the lamp body 1. For ease of description, along the direction from the edge of the lamp body 1 toward the center thereof, multiple heat dissipation fins are sequentially denoted as a first heat dissipation fin 34111, a second heat dissipation fin 34112 . . . a nth heat dissipation fin 3411*n*. When the insertion portion 35 is inserted into the insertion hole 3411 of the first heat dissipation fin 34111, the spacing between the two lamp bodies 1 located at two ends of the connector 2 is relatively large. When the insertion portion 35 is inserted into the insertion hole 3411 of the second heat dissipation fin 34112, compared with the case where the insertion portion 35 is inserted in the insertion hole 3411 of the first heat dissipation fin 34111, the spacing between the two lamp bodies 1 located at two ends of the connector 2 is slightly reduced. When the insertion portion 35 is inserted into the insertion hole 3411 of the nth heat dissipation fin 3411*n*, the spacing between the two lamp bodies 1 located at two ends of the connector 2 is the smallest.

Optionally, the receiving portion 34 further includes a stop block 342. Along the direction along which the insertion portion 35 is inserted into the insertion hole 3411, the stop block 342 is located behind the multiple risers 341. When the insertion portion 35 is inserted into the insertion hole 3411 of the riser 341 adjacent to the stop block 342, the insertion portion 35 can abut the stop block 342. In this embodiment, the stop block 342 is located behind the nth heat dissipation fin 3411*n*. The setting of the stop block 342 can prevent the insertion portion 35 from being excessively inserted into the insertion hole 3411 of the nth heat dissipation fin 3411*n* and avoid the phenomenon that the insertion portion 35 contacts with other structures of the lamp body 1, causing the lamp body 1 to be damaged.

Optionally, the connector 2 includes multiple connection parts 21 disposed in parallel and connected to each other. Two ends of each connection part 21 are connected to two lamp bodies 1 adjacent to the each connection part 21 by locking connection structures 3 in a one-to-one manner. In other words, one end of each connection part 21 is connected to the lamp body 1 corresponding to the one end by one locking connection structure 3. In this manner, a multi-point connection can be formed between the connector 2 and the lamp body 1 to ensure a more stable connection between the connector 2 and the lamp body 1.

In this embodiment, an extension part 22 is disposed between two adjacent connection parts 21. The two adjacent connection parts 21 are securely connected to two ends of the extension part 22 in a one-to-one manner. In other words, the two connection parts 21 connected to two ends of the extension part 22 and the extension part 22 have an H-shaped structure as a whole so that the stability of the connection between the connector 2 and the lamp body 1 can be improved. In other embodiments, the extension part 22 may not be disposed. Only two adjacent connection parts 21 need to cross each other and need to be securely connected to each other. In other words, two adjacent connection parts 21 have an X-shaped structure.

In this embodiment, multiple connectors 2 include first connectors 2*a*. Each first connector 2*a* includes two first connection portions 20*a* in a shape of a flat plate. The two first connection portions 20*a* are connected to two lamp bodies 1 adjacent to the two first connection portions 20*a* in a one-to-one manner. Two first connection portions 20*a* of the same first connector 2*a* are parallel to each other. The two first connection portions 20*a* of the same first connector 2*a* are located in the same plane. In other words, the first connector 2*a* is integrally in a shape of a flat plate so that the two lamp bodies 1 adjacent to the first connector 2*a* are located in the same plane. That is, after the installation of the lamp is completed, the height of the two lamp bodies 1 adjacent to the first connector 2*a* from the ground is the same so that the lamp provides a more uniform light.

In other embodiments, of the two first connection portions 20*a* of the same first connector 2*a*, one first connection portion 20*a* is located above another first connection portion 20*a* along the direction perpendicular to the first connection portions 20*a*. In other words, along the direction parallel to the first connection portions 20*a*, the first connector 2*a* has a Z-shaped structure when viewed from the side. After the installation of the lamp is completed, the height of the two lamp bodies 1 adjacent to the first connector 2*a* from the ground is different, for example, one high and one low, so that different light requirements can be met.

Optionally, multiple connectors 2 further include second connectors 2*b*. Each second connector 2*b* includes two second connection portions 20*b* in a shape of a flat plate. The two second connection portions 20*b* are connected to the two lamp bodies 1 adjacent to the two second connection portions 20*b* in a one-to-one manner. An included angle is formed between two second connection portions 20*b* of the same second connector 2*b*.

Exemplarily, the lamp body 1 is in a shape of a square. When the lamp includes five lamp bodies 1, one lamp body 1 is located in the middle. The remaining four lamp bodies 1 are connected to the four sides of the lamp body 1 in the middle by second connectors 2*b* in a one-to-one manner. In this manner, the light-emitting directions of the remaining four lamp bodies 1 can be converged towards the lamp body 1 in the middle so that the light of the five lamp bodies 1 can be concentrated, and the light intensity can be improved. In addition, the lamp may include three rows of lamp bodies 1 denoted as a first row of lamp bodies 1*a*, a second row of lamp bodies 1*b*, and a third row of lamp bodies 1*c*. Each row of lamp bodies 1 include multiple lamp bodies 1. The first row of lamp bodies 1*a* are located in the middle. The second row of lamp bodies 1*b* and the third row of lamp bodies 1*c* are located on two sides of the first row of lamp bodies 1*a*, respectively. In the first row of lamp bodies 1*a*, two adjacent lamp bodies 1 are connected by a first connector 2*a*. Similarly, in the second row of lamp bodies 1*b*, two adjacent lamp bodies 1 are connected by a first connector 2*a*. In the third row of lamp bodies 1*c*, two adjacent lamp bodies 1 are connected by a first connector 2*a*. Two adjacent lamp bodies 1 between the first row of lamp bodies 1*a* and the second row of lamp bodies 1*b* and two adjacent lamp bodies 1 between the first row of lamp bodies 1*a* and the third row of lamp bodies 1*c* are separately connected by a second connector 2*b*. Thus, the light-emitting directions of the second row of lamp bodies 1*b* and the third row of lamp bodies 1*c* are converged towards the first row of lamp bodies 1*a* so that the light of the three rows of lamp bodies 1 can be concentrated, and the light intensity can be improved. Of course, the lamp may be arranged in other forms or may be arranged according to scenario requirements. The arrangement mode is not limited herein.

What is claimed is:

1. A lamp, comprising a plurality of lamp bodies and a plurality of connectors, wherein each connector of the plurality of connectors is disposed between every two adjacent lamp bodies, one end of each connector is connected to a respective lamp body corresponding to the one end by at least one locking connection structure, the respective lamp body is configured to be moved towards or away from each connector connected to the respective lamp body, and the at least one locking connection structure is configured to lock the one end of each connector to the respective lamp body corresponding to the one end or unlock the one end of each connector from the respective lamp body corresponding to the one end, wherein each of the at least one locking connection structures comprises:

a receiving portion disposed in one of the connector or the respective lamp body corresponding to the connector; and an insertion portion disposed in another one of the connector or the lamp body corresponding to the connector, wherein the insertion portion is configured to be inserted into or separated from the receiving portion, wherein the receiving portion comprises a plurality of risers disposed at intervals, and each of the plurality of risers disposed at intervals is provided with an insertion hole; the insertion portion is configured to be inserted into the insertion hole of each of at least one riser of the plurality of risers, the insertion portion is provided with an elastic piece, and the elastic piece is configured to generate elastic deformation and prevent the insertion portion from being pulled out from the insertion hole of each of the at least one riser.

2. The lamp according to claim 1, wherein the plurality of connectors comprise at least one of the following:

at least one first connector, wherein each first connector comprises two first connection portions, each of which is in a shape of a flat plate, the two first connection portions are connected to two adjacent lamp bodies in one-to-one correspondence, and the two first connection portions of the first connector are parallel to each other; or at least one second connector, wherein each second connector comprises two second connection portions, each of which is in a shape of a flat plate, the two second connection portions are connected to two adjacent lamp bodies in one-to-one correspondence, and an included angle is formed between planes where the two second connection portions of the second connector are located respectively.

3. The lamp according to claim 2, wherein of the two first connection portions of the first connector, one first connection portion is located above another first connection portion along a direction perpendicular to the two first connection portions; or the two first connection portions of the first connector are located in a same plane.

4. The lamp according to claim 1, wherein each of the at least one locking connection structure comprises:

a connection hole disposed in one of the connector or the lamp body corresponding to the connector;

a long connection hole disposed in another one of the connector or the lamp body corresponding to the connector; and a locking member inserted in the connection hole and the long connection hole, wherein the locking member is configured to be moved in the long connection hole and lock the connector to the lamp body corresponding to the connector or unlock the connector from the lamp body corresponding to the connector.

5. The lamp according to claim 1, wherein the receiving portion further comprises a stop block; along a direction along which the insertion portion is inserted into the insertion hole, the stop block is located behind the plurality of risers disposed at intervals; and in a case where the insertion portion is inserted in the insertion hole of a riser adjacent to the stop block, the insertion portion abuts the stop block.

6. The lamp according to claim 1, wherein the receiving portion is disposed on the lamp body, and the plurality of risers disposed at intervals are heat dissipation fins of the lamp body.

7. The lamp according to claim 1, wherein each connector comprises a plurality of connection parts disposed in parallel and connected to each other, and two ends of each of the plurality of connection parts are connected to two lamp bodies adjacent to the each of the plurality of connection parts by locking connection structures in a one-to-one manner.

8. The lamp according to claim 7, wherein an extension part is disposed between two adjacent connection parts of the plurality of connection parts, and the two adjacent connection parts are securely connected to two ends of the extension part in a one-to-one manner; or two adjacent connection parts of the plurality of connection parts cross each other and are securely connected to each other.

* * * * *